United States Patent [19]

Hsiao et al.

[11] Patent Number: 5,235,338
[45] Date of Patent: Aug. 10, 1993

[54] MOVING TARGET DETECTION THROUGH RANGE CELL MIGRATION RADAR

[76] Inventors: Stephen S. Hsiao, 6 Sterling Ct., Plainview, N.Y. 11803; Philip G. Grieve, 3 Hanover Sq., Apt. 20F, New York, N.Y. 10004

[21] Appl. No.: 606,958

[22] Filed: Oct. 31, 1990

[51] Int. Cl.$^5$ .......................... G01S 13/52; G01S 7/295
[52] U.S. Cl. .................................... 342/109; 342/162; 342/196
[58] Field of Search ............... 342/109, 110, 160, 196, 342/90, 96, 111, 115, 192, 195, 179, 162

[56] References Cited

U.S. PATENT DOCUMENTS 4,916,452 4/1990 Borchert et al. ............... 342/109

OTHER PUBLICATIONS

Geometric Aspects of Long Term Non-Coherent Intergration, Allen et al. (IEEE, vol. 25, No. 5, Sep. 1989).

Primary Examiner—Gilberto Barrón, Jr.
Attorney, Agent, or Firm—William B. Ritchie

[57] ABSTRACT

Radar signal processor for the detection of fast moving targets having small radar cross-sections. A method and apparatus is used to analyze a target that may travel through many range cells during coherent integration time. By transforming the pulse return data into the spatial frequency domain, range bin migration problems have been solved. The signal to noise ratio is also improved thereby permitting the detection of small targets. The processing consists of three major steps: performing an FFT for each pulse to yield spatial frequency components for each return; performing a special DFT for each spatial frequency yielding constant velocity output for each spatial frequency; and finally performing an inverse FFT to obtain target velocity and position.

21 Claims, 5 Drawing Sheets

Function operation chart of MTI/TRM signal processor
Method 1

Illustration of Special Domain Function $G(\omega_x, \omega_d)$
for Point Moving Target Function operation chart of MTI/TRM signal processor
Method 1

Function operation chart of MTI/TRM signal processor
Method 2

Available data are in a rectangular grid (small circles)

Required data points are in a uniform keystone polar grid (black dots)

Geometrical interpolation from rectangular grid to keystone polar grid

Schematic diagram of a typical MTI radar where the MTI/TRM signal processor is implemented

MOVING TARGET DETECTION THROUGH RANGE CELL MIGRATION RADAR

BACKGROUND OF THE INVENTION

1. Field of the Invention

The invention relates to moving target detection radar.

2. Description of the Related Art

Present and future military vehicles (both ground and air) are being designed with smaller radar cross-sections (RCS). Therefore, to detect such vehicles, the performance of detecting and tracking such vehicles must be correspondingly improved.

One way to provide improved detection performance in radar against low RCS targets is integrate the target echo from a large number of pulses, thus increasing the effective signal-to-noise ratio (SNR). However, as the target moves relative to the radar, the target moves through many range resolution cells during the integration time and the intended increase in SNR will not occur.

All prior art in dealing with target range migration problems are based on what is called a multiple target path hypothesis approach. That method relies on the pre-assumed multiple target path in a given geometry and then processing the collected data, either coherently or non-coherently, along each possible pre-assumed target path. The signal processing of this approach is excessive and cumbersome because of the required multiple target paths. One example of such technique is given in *Geometric Aspects of Long Term Non-Coherent Integration*, Allen et al. (IEEE, Vol. 25, No. 5, Sep. 1989). In addition to the excessive signal processing, another drawback is the ambiguity of a strong fast moving target being construed as several small targets, one in each range bin.

The prior art does not provide an efficient and viable apparatus and method for the detection of fast moving vehicles having small radar cross-sections.

SUMMARY OF THE INVENTION

It is an object of the invention to provide a radar apparatus and method that overcomes the range bin migration problem associated with moving targets.

It is another object of the invention to provide a radar apparatus and method that provides increased efficiency in detecting targets that have small radar cross-sections.

It is still another object of the invention to provide a radar apparatus and method that provides for an improved signal to noise ratio.

It is still another object of the invention to provide a radar apparatus and method that compensates for moving target detection without requiring a pre-assumed target trajectory.

It is still a further object of the invention to provide a radar apparatus and method that can resolve ambiguity of a strong fast moving target versus several small targets, one in each range bin.

It is still a further object of the invention to provide a radar apparatus and method that can handle multiple targets in the field without increasing processing load.

It is another object of the invention to provide a radar apparatus and method that can provide knowledge about where a target starts or ends during integration time.

It is another object of the invention to provide a radar apparatus and method that can provide target radial velocity without any ambiguity.

It is a final object of the invention to provide a radar apparatus and method that can reduce ground clutter in each range bin by providing smaller range bin sizes.

The invention is a radar signal processor having an input of a plurality of radar pulse returns from a target with each pulse return having a plurality of range resolution cells yielding a range cell-pulse return complex. First means for performing a FFT for each radar returned pulse transforming the range cell data into the spatial frequency domain is provided. Second means is provided for performing a special DFT for output signal provided by said first means by which the output of said second means corresponds to a plurality of constant velocities which each velocity being the same for each spatial frequency. Third means is provided for performing an inverse FFT and summing the output signal provided by said second means for each velocity output with respect to the corresponding spatial frequencies. The output of third means corresponds to the velocity and position information that corresponds to said target.

DETAILED DESCRIPTION OF THE INVENTION

Figure 1:
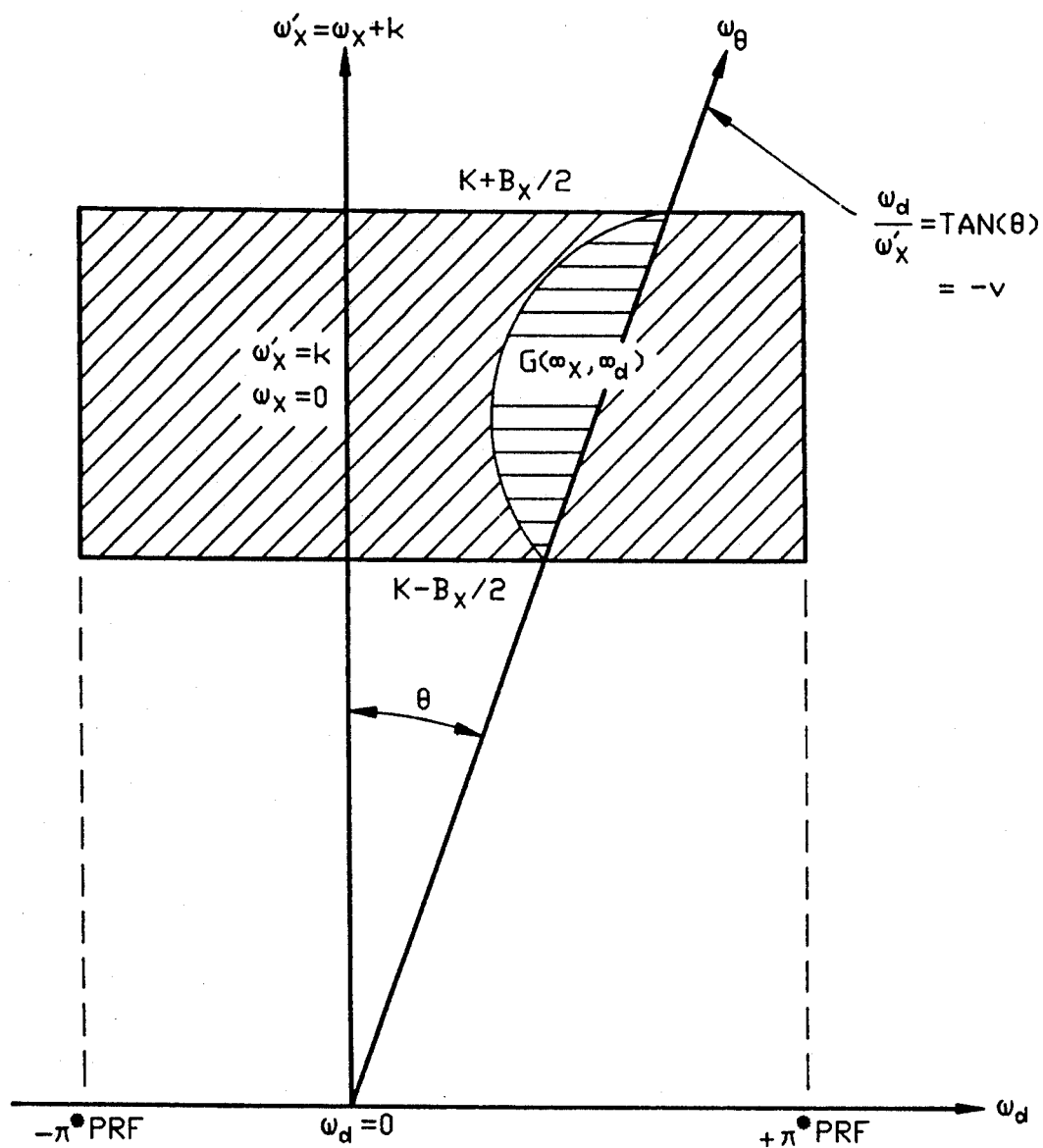
FIG. 1 illustrates Spectral Domain Function $G(\omega_x, \omega_d)$ for Point Moving Target according to invention.

The inventors have found that the range migration problem of a moving target can be solved in the spatial frequency domain for the required Doppler signal processing. After Doppler processing for each spatial frequency, the final target detection is accomplished by summing up all the spatial frequency components for each given target velocity.

BACKGROUND

Let $x_n = x_o + vn\Delta t$ be the range of a moving target at the time $n\Delta t$ where $x_o$ is the starting location of the target at $t=0$, $\Delta t$ is the inter-pulse period (IPP) of the transmitted pulses, $v$ is the target radial velocity, and $n$ is the nth pulse of the transmitted pulse sequence during the coherent integration time. All range locations are measured relative to a central reference point (CRP) in the target field. Let $A(t)e^{j\omega_c t}$ be the waveform of the transmitted pulse, the returned signal from the point moving target will be $$A\left(t - \frac{2x_n}{c}\right)e^{j\omega_c(t - 2\frac{x_n}{c})}.$$

After mixing,

-continued $$q(t) = A\left(t - \frac{2x_n}{c}\right)e^{-j\frac{2\omega c}{c}x_n} = A\left(t - \frac{2x_n}{C}\right)e^{-jkx_n} \quad (1)$$

where $k = \frac{4\pi}{\lambda}$.

If time $t$ is converted to range $x$ by $t = \frac{2x}{c}$, then $$q(x) = A\left(\frac{2x}{c} - \frac{2x_n}{c}\right)e^{-jkx_n} = \tilde{A}(x - x_n)e^{-jkx_n} \quad (2)$$

White noise is then added to this signal by the radar receiver before it goes through a matched filter. The output of the radar receiver has the form of $$g(x) = \hat{g}(x - x_n)e^{-jkx_n} \quad (3)$$

where $\hat{g}(\cdot)$ is the autocorrelation function of $\tilde{A}$. The output function $g(x)$ is then sampled at an interval equal to the 3 db width of the autocorrelation function. This process is called "range gating the return of the radar pulse." Each sampling point corresponds to a resolution cell, or "range gate" and multiple targets in range can be separated by this technique. For moving target detection, a sequence of pulses is coherently integrated at each range gate through a Doppler processing. The output at each range gate after Doppler processing can give enhanced target SNR as well as the target radial velocity information. If the target moves through many range cells during the integration time, the intended SNR increase will not occur. To overcome this problem, a spatial frequency transformation is performed on the return of each transmitted radar pulse $g(x)$, yielding $$G(\omega_x) \triangleq \int g(x)e^{-\omega xx}dx = \hat{G}(\omega_x)e^{-j(\omega x + k)x_0}e^{-j(\omega x + k)n V\Delta t} \quad (4)$$

where $\hat{G}(\omega_x) \triangleq \int \hat{g}(x)e^{-j\omega xx}dx$ is the Fourier transform of the autocorrelation function $\hat{g}(x)$.

After the spatial frequency processing for each pulse, a Doppler processing (i.e., Fourier transform) is performed with respect to $n\Delta t$ for each fixed spatial frequency $\omega_x$, yielding $$G(\omega_x,\omega_d) \triangleq \int_{-\frac{T}{2}}^{\frac{T}{2}} G(\omega_x) e^{-j\omega_d n\Delta t} dn\Delta t = \quad (5)$$

$$\hat{G}(\omega_x) e^{-j(\omega_x k)x_0} \cdot T \cdot \text{sinc}\left[\frac{T}{2}[\omega_d + (\omega_x + k)V]\right]$$

where $\omega_d$ is the Doppler frequency and the integration period in time is selected from $$-\frac{T}{2} \text{ to } \frac{T}{2}$$

for convenience. This selection produces a sinc($\cdot$) function with magnitude equal to T, the total integration time. $G(\omega_x,\omega_d)$ of Eq (5) now represents a spectral domain function of a point moving target. It is a two-dimensional Fourier transform of a data set, collected as a function of range and time, of a moving target.

Examination of Eq. (5) reveals the properties described below. The first term $\hat{G}(\omega_x)$ is the spectrum of the output autocorrelation function of the radar receiver. This function is bandlimited with bandwidth $B_x$ equal to the bandwidth of the radar receiver, i.e., $$\hat{G}(\omega_x) = 0 \text{ for } |\omega_x| > \frac{B_x}{2}.$$

The second term is a linear phase term in $\omega_x$ with $x_0$ as the phase constant. This term contains the information on the starting location of the moving target $x_0$ and is important when going back to the range domain through an inverse FFT in the later process. The third term T is the total integration time, and it represents the total signal gain through coherent integration.

The fourth term of Eq (5) has the key property of $G(\omega_x,\omega_d)$. This term is a sinc($\cdot$) function in the $(\omega_x,\omega_d)$ domain. The peak of this function indicates how the energy of a moving target is distributed in the $(\omega_x,\omega_d)$ domain. The peaks of this function occur at $\omega_d + (\omega_x + k)v = 0$ or $$\frac{\omega_d}{\omega_x + k} = -v \quad (6a)$$

It is more convenient to define a new variable $\omega'_x = \omega_x + k$ so that Eq (6a) has the form of $$\frac{\omega_d}{\omega_x'} = -v \quad (6b)$$

FIG. 1 shows that Eq. (6a) or Eq (6b) represents a straight line in the $(\omega_x,\omega_d)$ or $(\omega'_x,\omega_d)$ domain. The slope of this straight line equals the negative value of the moving target radial velocity v, and this line passes through the origin of $\omega'_x$ and $\omega_d$ axis. If there are multiple moving targets in the target field, each with different radial velocity, then each moving target will be represented by a straight line that passes through $\omega'_x = \omega_d = 0$ and has a slope that equals the negative value of radial velocity v. Further, the combination of all four terms of Eq (5) limits the value of the straight lines of $G(\omega'_x,\omega_d)$ to the shaded area shown in FIG. 1. The limitation in $\omega'_x$ axis is by the bandwidth $B_x$ of $\hat{G}(\omega_x)$ and is centered at $\omega_x = 0$ or $\omega'_x = +K$. The limitation in $\omega_d$ axis is imposed by the PRF of the radar integration. The unambiguous Doppler frequency for $\omega_d$ is from $-\pi*$PRF to $\pi*$PRF in radians/sec. Since the energy of a moving target with constant radial velocity v is spread along a straight line in the shaded area of FIG. 1, all of this energy can be recovered by an inverse Fourier transform along this line.

A polar coordinate system $(\omega_\theta,\theta)$ in the $(\omega'_x,\omega_d)$ domain is defined such that $$\omega_d = \omega_\theta \sin \theta$$

$$\omega'_x = \omega_\theta \cos \theta \quad (7)$$

From FIG. 1 it is seen that the required integration along the straight line $$\frac{\omega_d}{\omega_x'} = -v$$

can be carried out with only one polar coordinate $\omega_\theta$ while keeping the other coordinate $\theta$ equal to a constant such that $\tan \theta = -v$. Rewriting $G(\omega'_x, \omega_d)$ of Eq (5) in the form of $G(\omega_\theta, \theta)$, it can be shown that the inverse Fourier transform along $\omega_\theta$ axis has the form of $$g(x_\theta, \theta) \triangleq \frac{1}{2\pi} \int_{-\infty}^{\infty} G(\omega_\theta, \theta) e^{j\omega_\theta x_\theta} d\omega_\theta = \quad (8)$$

$$\left(\frac{T}{\cos\theta}\right) e^{+jk\left(\frac{x_\theta}{\cos\theta} - x_0\right)} \hat{g}\left(\frac{x_\theta}{\cos\theta} - x_0\right)$$

Here $\theta$ is treated as a constant that equals $\tan^{-1}(-v)$ and $v$ is the constant radial velocity of the moving target represented by the $G(\omega_\theta, \theta)$ function. Since $X_\theta$ and $\omega_\theta$ are Fourier transform pairs, so are $x$ and $\omega'_x$. Therefore, $\omega_\theta X_\theta = \omega'_x X$ for all $\theta$. Since $\omega_\theta \cos\theta = \omega'_x$, by definition, it is seen that the variable $$\frac{x_\theta}{\cos\theta} = x$$

in Eq (8), and Eq (8) can be written in the form of $$g(x_\theta, \theta) = g(x, v) = \left(\frac{T}{\cos\theta}\right) \hat{g}(x - x_0) e^{+jk(x - x_0)} \quad (9)$$

Here $\hat{g}(x - x_o)$ is the output autocorrelation function of the radar receiver for a point moving target located at $x = x_o$ when $t = 0$. T is the coherent integration gain through Doppler processing, and the factor $$\frac{1}{\cos\theta}$$

is a constant caused by inverse Fourier transform in the $(\omega'_x, \omega_d)$ domain along a line in $\omega_\theta$ that is larger than $\omega'_x$ by a factor of $1/\cos\theta$. Equation (9) shows that the total target strength of a moving target can be recovered through spectral domain processing, although it may have moved through many range bins during the coherent integration time. This analysis applies to a single target. A sequence of matched filters must be provided for each different target velocity.

OPERATION OF THE MTI/TRM SIGNAL PROCESSOR

Two digital implementation methods have been developed for the Moving Target Detection Through Range-bin Migration (MTI/TRM) signal processor; each using a different embodiment of the invention.

Figure 2:
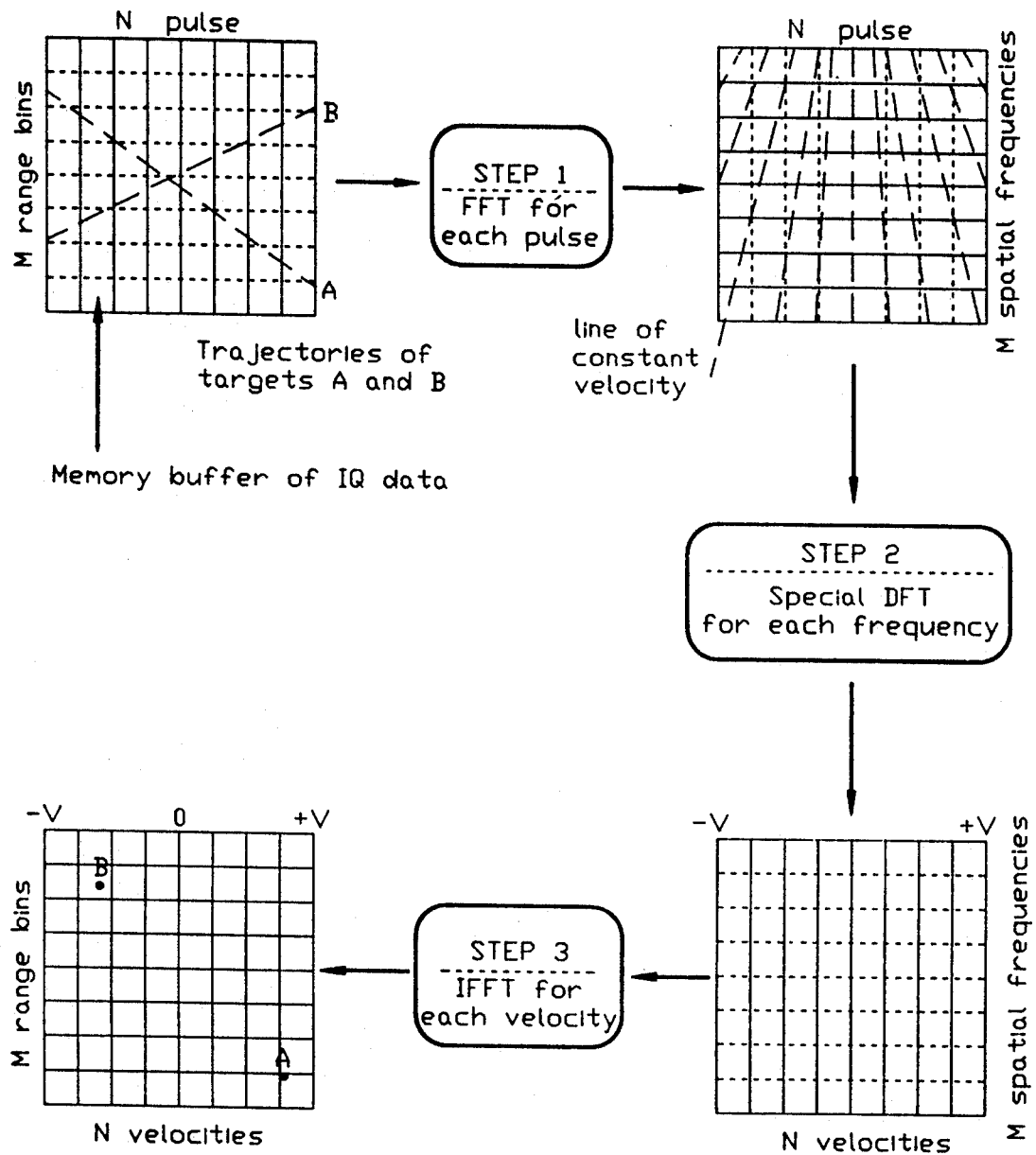
FIG. 2 illustrates a functional operation chart of the preferred embodiment of the invention.

FIG. 2 illustrates the flow of signal processing data using one variation of the invention. The data set at start is the return of N radar pulses collected during the coherent integration time. Each pulse return consists of M range resolution cells yielding an M by N complex. The complex numbers in the form of I(in phase) Q(quadrature phase) data are stored in a memory buffer. The first step is to perform a Fast Fourier Transform (FFT) for each radar return, yielding a spatial frequency domain function for each return:

$$\overline{X}_n(m\Delta f_x) = \sum_{i=0}^{M-1} X_n(i\Delta X)\, \overline{W}_M^{m \cdot i} \quad \begin{array}{l} 0 \leq m \leq M-1 \\ 0 \leq n \leq N-1 \end{array} \quad (10)$$

where $x_n(i\Delta x)$ is the radar return in the ith range cell for the nth pulse. $\overline{X}_n(m\Delta f_x)$ is the mth spatial frequency component of the nth pulse after FFT, $\Delta x$ is the range resolution and $\Delta f_x$ is the spatial frequency resolution.

$$\overline{W}_M \triangleq e^{-j\frac{2\pi}{M}}$$

is used by assuming M has the dimension equal to the power of 2 so that the FFT algorithm can be used. The next step in FIG. 2 is novel to the MTI/TRM signal processing technique. Instead of performing Doppler processing on the component of each spatial frequency $\omega_x$, yielding a function given by (5) on the $(\omega_x, \omega_d)$ domain, a special Discrete Fourier Transform (DFT) is performed such that the output of this process corresponds to a series of constant velocities rather than a series of Doppler frequencies. This process is carried out for all spatial frequencies such that the output velocity sequences are the same for each spatial frequency. Therefore, when an inverse FFT in the $(\omega_x, \omega_d)$ domain is performed, it does not have to be done along a line that has a slope equal to $-v$. Instead, each digital output of the special DFT has the same velocity for all spatial frequency components, as is illustrated in FIG. 2. The inverse FFT can then be easily performed for each velocity output with respect to M spatial frequencies. To see how this special DFT is formulated, Eq (4) has the form of $$\begin{aligned} G(\omega_x) &= \hat{G}(\omega_x)\, e^{-j(\omega_x + k)x_0} \cdot e^{-j(\omega_x + k)vn\Delta t} \\ &= \hat{G}(\omega_x)\, e^{-j\omega_x' x_0} \cdot e^{-j\omega_x' vn\Delta t} \end{aligned} \quad (11)$$

for a constant-velocity moving target in the spatial frequency domain. The conventional Doppler processing is to match a series of constant Doppler frequencies $\omega_d = \hat{n}\Delta\omega_d$ for $\hat{n} = -1, 2, \ldots N$ by multiplying Eq (11) with a term $e^{j\omega_d n\Delta t}$ and integrating over n pulses. When the moving target Doppler $\omega'_x v$ is within one of the Doppler frequency resolution cells of width $\Delta\omega_d$, this Doppler filter is matched to the target Doppler and will have a peak output. However, as is seen from Eq (11), the Doppler frequency $\omega'_x v$ is now a function of spatial frequency $\omega'_x$. Since it is the constant target velocity that is sought, each Doppler filter has to be tuned to the velocity v for all spatial frequencies to match that target velocity. In other words, the matched filters in the spatial frequency domain are built to match each constant velocity and not each constant Doppler. The result of one constant-velocity match filter output is $$\begin{aligned} Y(v, \omega_x') &= \sum_{i=0}^{N-1} G(\omega_x)\, e^{j\omega_x' v i \Delta t} \\ &= N\hat{G}(\omega_x)\, e^{-j\omega_x' x_0} \end{aligned} \quad (12)$$

for all spatial frequencies $\omega'_x$.

In practice, a range of all target velocities of interest must be implemented. Therefore, let $$v = n\Delta v \text{ for } -\frac{N}{2} \leq n \leq \frac{N}{2}$$

and $\Delta V$ is the velocity resolution. Equation (12) then has the form of $$Y(n\Delta v) = \sum_{i=0}^{N-1} G(\omega_x) e^{j\omega x' \cdot n\Delta v \cdot i\Delta t} \qquad (13)$$

$Y(n\Delta v)$ is the output for each matched velocity filter, and the above processing must be performed for each spatial frequency component $\omega'_x$. Since $\omega'_x$ must also be discrete, as given by $X_n(m\Delta f_x)$ of Eq (10), the multiplier in Eq (13) can be simplified to a form of $$= e^{j(\omega x + k)n \cdot i \cdot \Delta v \Delta t} \qquad (14)$$

$$= e^{+j\frac{2\pi}{N}(1+m\frac{\lambda}{2\Delta R})n \cdot i}$$

where $$k = \frac{4\pi}{\lambda}, \quad \omega_x = 2\pi m\Delta f_x, \quad \Delta f_x = \frac{1}{\Delta R},$$

is the wavelength, $\Delta R$ is the range extent, and m is the spatial frequency index. Equation (13) now has the form of $$Y_m(n\Delta v) = \sum_{i=0}^{N-1} X_i(m\Delta f_x) \overline{W}_N(m)^{i \cdot n} \quad -\frac{N}{2} \leq n \leq \frac{N}{2} \qquad (15)$$

where $$\overline{W}_N(m) \triangleq e^{+j\frac{2\pi}{N}(1+m\frac{\lambda}{2\Delta R})} \quad 0 \leq m \leq M-1$$

$Y_m(n\Delta v)$ is the output of the nth velocity filter for the mth spatial frequency component.

Note that the direct evaluation of Equation (15) requires computation proportional to M·N. This may become prohibitive when M and N get large. One trick that can overcome this problem is proposed by L. I. Bluestein, *A Linear Filtering Approach to the Computation of Discrete Fourier Transform*, IEEE Trans. Vol. AV-18, Dec. 1970, pp. 451–455. His method can reduce the computation proportional to $(M+N-1)\cdot\log_2(M+N-1)$, a great saving for large M and N.

The last step is to sum up all spatial frequencies of the moving target at each of the velocity filters $n\Delta v$ by an inverse FFT. The formula is $$Z_n(m\Delta x) = \frac{1}{M} \sum_{k=0}^{M-1} Y_k(n\Delta v) \overline{W}_M^{k \cdot m} \qquad (16)$$

$$-\frac{N}{2} \leq n \leq \frac{N}{2} \qquad 0 \leq m \leq M-1$$

where $$\overline{W}_M \triangleq e^{-j\frac{2\pi}{M}}$$

assumes M equal to the power of 2 and $\Delta x$ is the range resolution. Note that in Eq (16), the velocity filters are selected from $$-\frac{N}{2}\Delta v \text{ to } \frac{N}{2}\Delta v,$$

but other velocity ranges can be selected at discretion.

Once a given range of velocity filters are selected, only those targets with radial velocities within the range will be detected. Targets with velocities outside the selected range will not be fully integrated; their SNRs will not be strong enough to be detected. There is no velocity ambiguity with this invention as compared to standard MTI radar.

In FIG. 2, the trajectories of two moving targets A and B have been shown, At the end of MTI/TRM processing, the locations of the two moving targets are shown at the range cell corresponding to the time at the end of the data collection interval. This display is possible since the location at the beginning of the integration, the velocity of the target and the integration time are all known.

Figure 3:
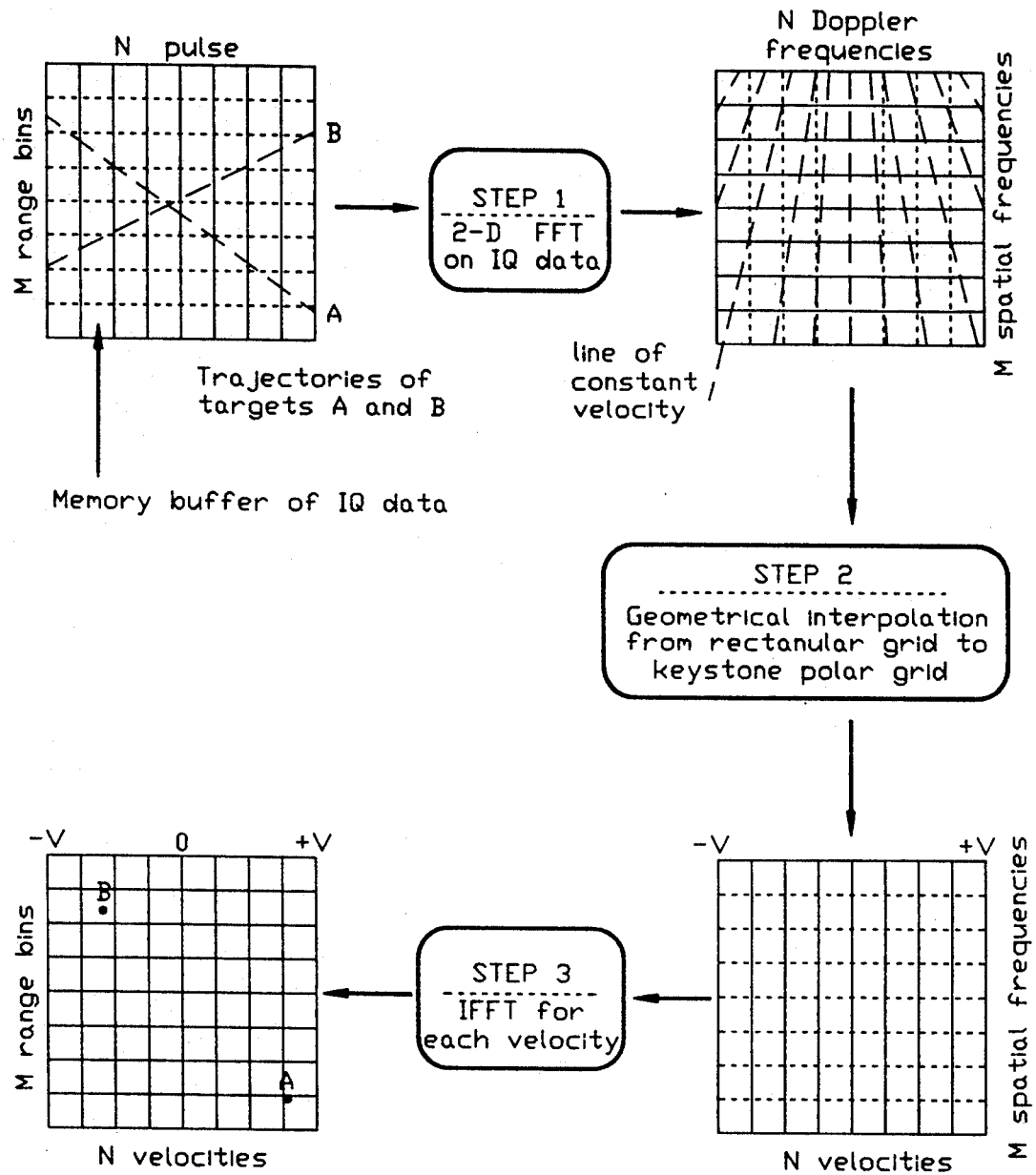
FIG. 3 illustrates a functional operation chart of an alternative embodiment of the invention.

A second method of implementing the equivalent signal processing of FIG. 2 is illustrated in FIG. 3. This method takes advantage of performing a two-dimensional (2-D) FFT on the same data set of FIG. 2. The output of which gives the spectral domain function of the target field as shown in FIG. 1. The available data set will be in discrete form on a rectangular grid given by $$G(m\Delta\omega_x, l\Delta\omega_d) = \sum_{n=0}^{N-1} \sum_{i=0}^{M-1} x_n(i\Delta x) \overline{W}_M^{m \cdot i} \cdot \overline{W}_N^{i \cdot n} \qquad (17)$$

$$0 \leq m \leq M-1$$

$$0 \leq l \leq N-1$$

where l and m are frequency indices on the $\omega_d$ and $\omega_x$ respectively. The M and N of $$\overline{W}_M \triangleq e^{-j\frac{2\pi}{M}} \text{ and } \overline{W}_N \triangleq e^{-j\frac{2\pi}{N}}$$

are assumed to have the dimensions equal to the power of 2 so that the 2-D FFT can be used.

The second step involves a geometrical interpolation in the $(\omega_x, \omega_d)$ domain on a rectangular grid data set given by Eq. (17) into a keystone polar grid. The output values of this keystone grid data set should be identical to those as give by Eq. (15)

$$Y_m(n\Delta v) = G(m\Delta\omega_x, n\Delta v) \qquad (18)$$

$$0 \leq m \leq M-1$$

$$-\frac{N}{2} \leq n \leq \frac{N}{2}$$

where the geometrical interpolation only needs to be carried out in the $\omega_d$ axis for each fixed $\omega_x$ axis. Note that even though the velocity spacing in Eq. (18) is a constant $\Delta V$ for each spatial frequency $m\Delta\omega_x$, the corresponding Doppler spacing $\hat{\Delta}\omega_d$ is different on each $m\Delta\omega_x$ axis. In other words, the spacing in Doppler $\hat{\Delta}\omega_d$ is a function of spatial frequency $m\Delta\omega_x$. The relationship is $$\hat{\Delta}\omega_d = (k + m\Delta\omega_x)\Delta v = k \cdot \Delta v \left(1 + m\frac{\lambda}{2\Delta R}\right) \quad (19)$$

where $k = \frac{4\pi}{\lambda}$

Figure 4:
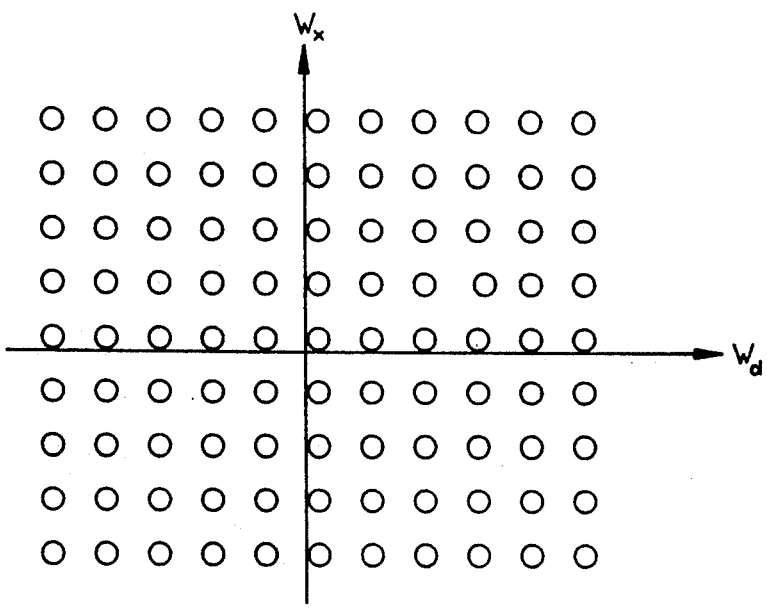
FIG. 4 illustrates a geometrical interpolation from a rectangular gird to a keystone polar grid according the invention.
Figure 4:
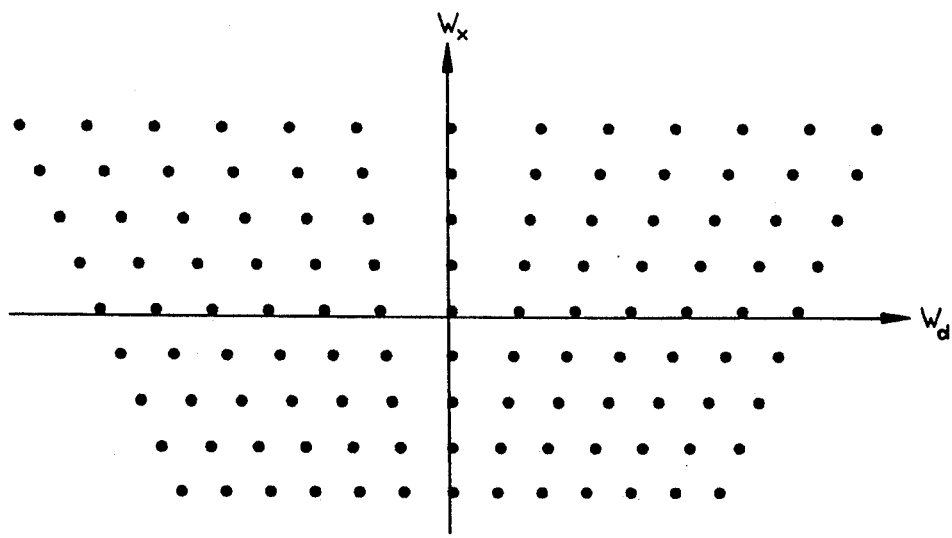

FIG. 4 shows the available rectangular grid versus the required keystone polar grid in the $(\omega_x, \omega_d)$ plane. Once all the data points for $Y_m(n\Delta v)$ have been obtained, the third step is the same as in FIG. 2 where an inverse FFT is performed on the interpolated polar grid data yielding the output data as shown by Eq. (16) and FIG. 3.

The first method is the preferred embodiment of the invention while the second method serves as an alternative because of the required geometrical interpolation may cause error and the processing load may be heavier than the first method.

Figure 5:
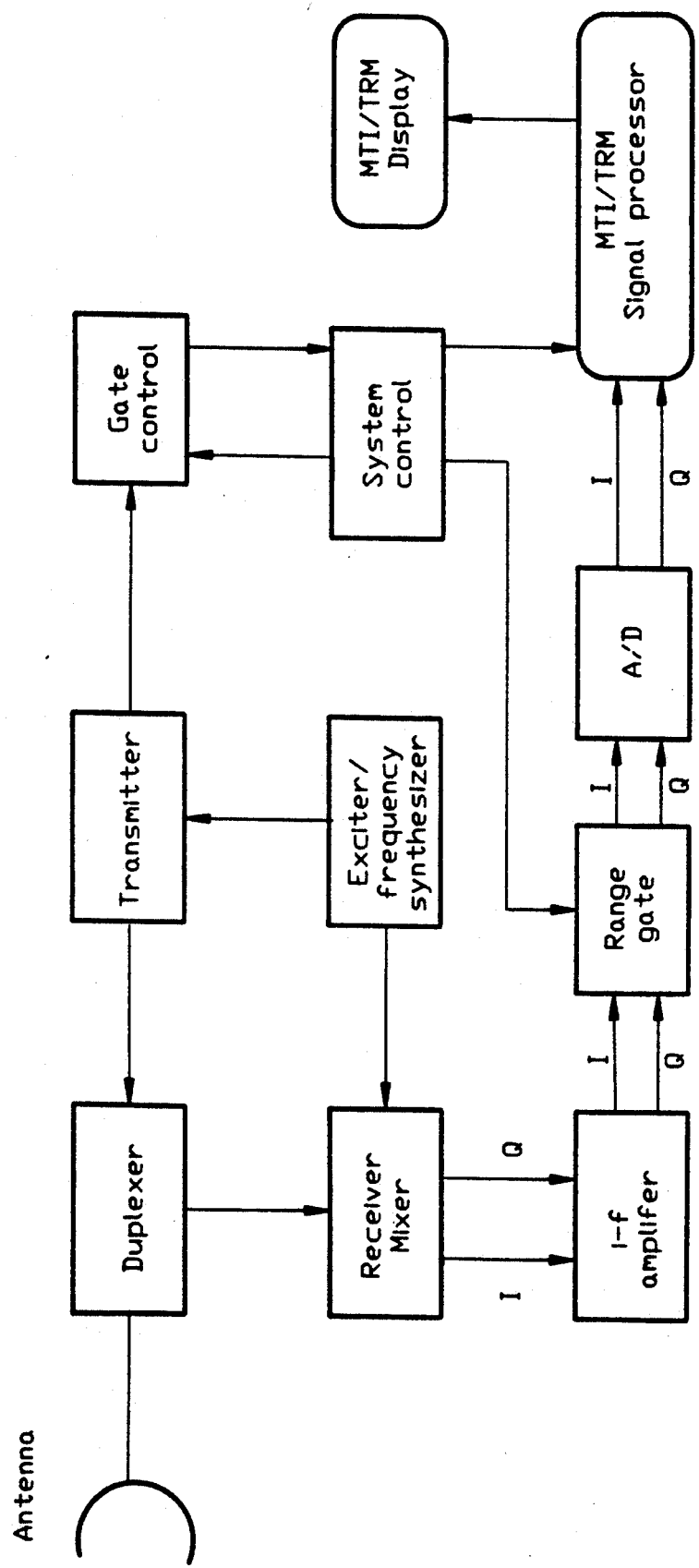
FIG. 5 illustrates a schematic diagram of the invention in use with a typical MTI radar.

FIG. 5 illustrates the implementation of the invention in a typical radar system. The system control box provides information such as PRF, coherent integration time, range extent and other parameters related to MTI processing into the MTI/TRM signal processor. The output is threshold and displayed in a MTI display.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A radar signal processor having an input for receiving a plurality of radar pulse returns from a target with each pulse return having a plurality of range resolution cells yielding a range cell pulse return complex, said processor comprising:
   first means for transforming the range cell data into corresponding spatial frequency data in the spatial frequency domain;
   second means for converting the spatial frequency data provided by the first means into spatial velocity data representing a plurality of constant velocities with each velocity being the same for each spatial frequency; and
   third means for transforming the spatial velocity data provided by the second means into time domain data representing the velocity and position information of the target.

2. The processor according to claim 1 wherein the first means for transforming comprises means for performing a fast Fourier transform (FFT) of each radar pulse return and wherein the third means for transforming comprises means for performing an inverse FFT of the spatial velocity data.

3. The processor according to claim 2 wherein the means for performing a FFT provides spatial frequency data according to the following:

$$\overline{X}_n(m\Delta f_x) = \sum_{i=0}^{M-1} X_n(i\Delta X)\overline{W}_M^{m \cdot i} \quad \begin{array}{l} 0 \leq m \leq M-1 \\ 0 \leq n \leq N-1 \end{array}$$

where: N is the return radar pulses collected during the coherent integration time with each pulse return consists of M range resolution cells yielding an M by N complex; $x_n(i\Delta x)$ is the radar return in the ith range cell for the nth pulse; $X_n(m\Delta f_x)$ is the mth spatial frequency component of the nth pulse after FFT: $\Delta x$ is the range resolution and $\Delta f_x$ is the spatial frequency resolution;

$$\overline{W}_M \triangleq e^{-j\frac{2\pi}{M}}$$

is used by assuming M has the dimension equal to the power of 2.

4. The processor according to claim 2 wherein the means for performing an inverse FFT provides time domain data according to the following:

$$Z_n(m\Delta x) = \frac{1}{M}\sum_{k=0}^{M-1} Y_k(n\Delta v)\overline{W}_M^{k \cdot m} \quad -\frac{N}{2} \leq n \leq \frac{N}{2}$$

$0 \leq m \leq M-1$ where: $n\Delta v$ are the velocity filters;

$$\overline{W}_M \triangleq e^{-j\frac{2\pi}{M}}$$

assumes M equal to the power of 2 and $\Delta x$ is the range resolution; the velocity filters are selected from $$-\frac{N}{2}\Delta v \text{ to } \frac{N}{2}\Delta v.$$

5. The processor according to claim 1 wherein the second means for converting comprises means for performing a discrete Fourier transform (DFT) of the spatial frequency data.

6. The processor according to claim 5 wherein the means for performing a discrete FFT provides spatial velocity data according to the following:

$$Y_m(n\Delta v) = \sum_{i=0}^{N-1} X_i(m\Delta f_x)\overline{W}_N(m)^{i \cdot n}$$

$-\frac{N}{2} \leq n \leq \frac{N}{2}$ where:

$$\overline{W}_N(m) \triangleq e^{+j\frac{2\pi}{N}(1+m\frac{\lambda}{2\Delta R})} \quad 0 \leq m \leq M-1;$$

$Y_m(n\Delta v)$ is the output of the nth velocity filter for the mth spatial frequency component.

7. A method for processing radar signals representing a plurality of radar pulse returns from a target with each pulse return having a plurality of range resolution cells yielding a range cell pulse return complex, said method comprising the steps of:
   transforming the range cell data into corresponding spatial frequency data in the spatial frequency domain;
   converting the spatial frequency data provided by the transforming step into spatial velocity data representing a plurality of constant velocities with each velocity being the same for each spatial frequency; and
   transforming the spatial velocity data provided by the converting step into time domain data representing the velocity and position information of the target.

8. The method according to claim 7 wherein the first transforming step comprises the step of performing a fast Fourier transform (FFT) of each radar pulse return and wherein the second transforming step comprises performing an inverse FFT of the spatial velocity data.

9. The method according to claim 8 wherein the step of performing a FFT provides spatial frequency data according to the following:

$$\underline{X}_n(m\Delta f_x) = \sum_{i=0}^{M-1} X_n(i\Delta x)\overline{W}_M^{m \cdot i} \quad \begin{matrix} 0 \leq m \leq M-1 \\ 0 \leq n \leq N-1 \end{matrix}$$

where: N is the return radar pulses collected during the coherent integration time with each pulse return consists of M range resolution cells yielding an M by N complex: $X_n(i\Delta x)$ is the radar return in the ith range cell for the nth pulse;

$\underline{X}_n(m\Delta f_x)$ is the mth spatial frequency component of the nth pulse after FFT; $\Delta x$ is the range resolution and $\Delta f_x$ is the spatial frequency resolution;

$$\overline{W}_M \triangleq e^{-j\frac{2\pi}{M}}$$

is used by assuming M has the dimension equal to the power of 2.

10. The method according to claim 8 wherein step of performing an inverse FFT provides time domain data according to the following:

$$Z_n(m\Delta x) = \frac{1}{M} \sum_{k=0}^{M-1} Y_k(n\Delta v)\overline{W}_M^{k \cdot m} \quad -\frac{N}{2} \leq n \leq \frac{N}{2}$$

$0 \leq m \leq M-1$ where; $n\Delta v$ are the velocity filters;

$$\overline{W}_M = e^{-j\frac{2\pi}{M}}$$

assumes M equal to the power of 2 and $\Delta x$ is the range resolution; the velocity filters are selected from $$-\frac{N}{2}\Delta v \text{ to } \frac{N}{2} \Delta v.$$

11. The method according to claim 7 wherein the step of coverting comprises performing a discrete Fourier transform (DFT) of the spatial frequency data.

12. The method according to claim 11 wherein the step of performing a discrete FFT provides spatial velocity data according to the following:

$$Y_m(n\Delta v) = \sum_{i=0}^{N-1} X(m\Delta f_x)\overline{W}_N(m)^{i \cdot n}$$

$-\frac{N}{2} \leq n \leq \frac{N}{2}$ where:

$$\overline{W}_N(m) = e^{+j\frac{2\pi}{N}(1+m\frac{\lambda}{2\Delta R})} \quad 0 \leq m \leq M-1;$$

$Y_m(n\Delta v)$ is the output of the nth velocity filter for the mth spatial frequency component.

13. A radar signal processing system comprising:
means for receiving a plurality of radar pulse returns from a target;
means for converting the pulse returns into range returns, each having a plurality of range resolution cells, and yielding a range cell pulse return complex; and
means for processing the complex including:

first means for transforming the range cell data into corresponding spatial frequency data in the spatial frequency domain;
second means for converting the spatial frequency data provided by the first means into velocity data representing a plurality of constant velocities with each velocity being the same for each spatial frequency; and
third means for transforming the spatial velocity data provided by the second means into time domain data representing the velocity and position information of the target.

14. The system according to claim 13 wherein the first means for transforming comprises means for performing a fast Fourier transform (FFT) of each radar pulse return and wherein the third means for transforming comprises means for performing an inverse FFT of the spatial velocity data.

15. The system according to claim 13 wherein the second means for converting comprises means for performing a discrete Fourier transform (DFT) of the spatial frequency data.

16. A radar signal processor having an input for receiving a plurality of radar pulse returns from a target with each pulse return having plurality of range resolution cells yielding an in-phase range cell pulse return complex and a quadrature phase range cell pulse return complex, said processor comprising:
first means for transforming the in-phase and quadrature phase range cell data into corresponding in-phase and quadrature phase spatial frequency data in the spatial frequency domain;
second means for converting the in-phase and quadrature phase spatial frequency data provided by the first means into in-phase and quadrature phase spatial velocity data representing a plurality of constant velocities with each velocity being the same for each spatial frequency; and
third means for transforming the in-phase and quadrature phase spatial velocity data provided by the second means into in-phase and quadrature phase time domain data representing the velocity and position information of the target.

17. A radar signal processing system comprising:
means for receiving a plurality of radar pulse returns from a target;
means for converting the pulse returns into in-phase and quadrature phase pulse returns, each having a plurality of range resolution cells, and yielding an in-phase range cell pulse return complex and a quadrature phase range cell pulse return complex; and
means for processing each of the complexes including:
first means for transforming the range cell data into corresponding spatial frequency data in the spatial frequency domain;
second means for converting the spatial frequency data provided by the first means into spatial velocity data representing a plurality of constant velocities with each velocity being the same for each spatial frequency; and
third means for transforming the spatial velocity data provided by the second means into time domain data representing the velocity and position information of the target.

18. The system according to claim 17 wherein the first means for transforming comprises means for performing a fast Fourier transform (FFT) of each radar pulse of the spatial frequency data and wherein the third means for transforming comprises means for performing an inverse FFT of the spatial velocity data.

19. The system according to claim 17 wherein the second means for converting comprises means for performing a discrete Fourier transform (DFT) of the spatial frequency data.

20. A radar signal processor having an input of a plurality of radar pulses returns from a target with each pulse return having a plurality of range resolution cells yielding a range cell-pulse return complex, with said radar signal processor comprising:

first means for performing a two dimensional FFT for the entire range cell-pulse return complex transforming the said data into the spectral domain;

second means for performing a geometrical interpolation of the output of said first means to transform said output from a rectangular grid to a keystone polar grid;

third means for performing a one-dimensional inverse FFT for each velocity output with respect to the corresponding spatial frequencies, with said third means having an output signal with a velocity and position information that corresponds to said target.

21. A method of radar signal processing radar pulses from a target with each pulse return having a plurality of range cells yielding a range cell-pulse return complex comprising:

transforming the entire range cell-pulse return complex data into the spectral domain by performing a two dimensional FFT;

changing the data from the first step from a rectangular grid to a keystone polar grid by performing a geometrical interpolation;

integrating the data from the second step for each velocity output with respect to the corresponding spatial frequencies which provides a result that corresponds to the velocity and position information of said target.

* * * * *